United States Patent
Choi et al.

(10) Patent No.: US 12,277,628 B2
(45) Date of Patent: Apr. 15, 2025

(54) FONT GENERATING SYSTEM AND FONT GENERATING METHOD BASED ON COMPONENT SEPARATION OF CHARACTER

(71) Applicant: FOUNDATION OF SOONGSIL UNIVERSITY-INDUSTRY COOPERATION, Seoul (KR)

(72) Inventors: Jae Young Choi, Seoul (KR); Jang Kyoung Park, Seoul (KR); Geun Ho Jeong, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 203 days.

(21) Appl. No.: 18/111,002

(22) Filed: Feb. 17, 2023

(65) Prior Publication Data

US 2024/0127502 A1   Apr. 18, 2024

(30) Foreign Application Priority Data

Oct. 14, 2022   (KR) .......................... 10-2022-0131907

(51) Int. Cl.
| | |
|---|---|
| *G06T 11/20* | (2006.01) |
| *G06F 3/08* | (2006.01) |
| *G06F 40/30* | (2020.01) |
| *G06N 3/04* | (2023.01) |
| *G06T 11/60* | (2006.01) |

(52) U.S. Cl.
CPC .................................. *G06T 11/203* (2013.01)

(58) Field of Classification Search
CPC ..... G06T 11/203; G06T 11/60; G06N 3/0455; G06N 3/047; G06N 3/044; G06N 3/045; G06F 3/049; G06F 3/08; G06F 18/24; G06F 40/30; G06F 40/216; G06F 40/109; G06F 40/129; G06F 40/126; G06F 40/151
See application file for complete search history.

(56) References Cited

FOREIGN PATENT DOCUMENTS

| | | | | |
|---|---|---|---|---|
| CN | 102511021 A | * | 6/2012 | ............. G06F 3/018 |
| CN | 113095086 B | * | 3/2024 | ............. G06F 18/24 |
| JP | 2016161983 A | * | 9/2016 | |
| KR | 10-1229175 B1 | | 2/2013 | |

OTHER PUBLICATIONS

Jangkyoung Park et al., "CCFont: Component-Based Chinese Font Generation Model Using Generative Adversarial Networks (GANs)", Applied Sciences, Aug. 10, 2022, pp. 1-20.

* cited by examiner

*Primary Examiner* — Wesner Sajous
(74) *Attorney, Agent, or Firm* — Stein IP, LLC (57) ABSTRACT

Provided are a font generating system and a font generating method. The font generating system and the font generating method of the present disclosure are provided to include a component decomposer which has at least one character input thereto and decomposes the input character into at least one component, a component converter which converts the at least one component into a component with a predetermined font to generate at least one imaging component, and a component recomposer which recomposes the at least one imaging component to generate a fonted character.

10 Claims, 13 Drawing Sheets

| 21 | 22 | 23 |
|---|---|---|
| 丹 | 丹 | 丹 |
| 有 | 月ナ | 月ナ |
| 的 | 勺白 | 、勺白 |
| 時 | 寺日 | 一十寸日 |
| 說 | 兌言 | ノレ口八言 |
| 就 | 京尤 | 一、口小、尤 |
| 煥 | 奐火 | 八冂一人ク人八 |
| 瑰 | 王鬼 | 一一十ノレムノ田 |
| 斃 | 敝死 | ソ八巾攵ノレ一、ク |
| 鏡 | 竟金 | ノレ日一ソ二ソ人一一十 |
| 鑄 | 壽金 | 一㇕口寸一十エソ人一一十 |
| 鐵 | 金䭾 | ソ人一一十口一一十十ノ、一レ |

| out | tgt | out | tgt | out | tgt | out | tgt |
|---|---|---|---|---|---|---|---|
| 月 | 月 | 連 | 連 | 真 | 真 | 素 | 素 |
| 秦 | 秦 | 鍋 | 鍋 | 腐 | 腐 | 催 | 催 |
| 競 | 競 | 恨 | 恨 | 畜 | 畜 | 掩 | 掩 |
| 沈 | 沈 | 臉 | 臉 | 探 | 探 | 端 | 端 |
| 秘 | 秘 | 仲 | 仲 | 俩 | 俩 | 剖 | 剖 |
| 油 | 油 | 極 | 極 | 短 | 短 | 鐘 | 鐘 |
| 辱 | 辱 | 狗 | 狗 | 遼 | 遼 | 盾 | 盾 |

| INDEX | L1loss↓ | L2loss↓ | SSIM↑ | FID↓ | Ref |
|---|---|---|---|---|---|
| zi2zi | 0.5104 | 0.4224 | 1.1619 | 104.8 | fine tuning |
| MX-Font | 0.5388 | 0.5360 | 0.3276 | 132.5 | non fine tuning |
| CCFont | 0.2728 | 0.2689 | 0.8808 | 29.2 | non fine tuning |

FONT GENERATING SYSTEM AND FONT GENERATING METHOD BASED ON COMPONENT SEPARATION OF CHARACTER

CROSS-REFERENCE TO RELATED APPLICATIONS

This application claims the priority of Korean Patent Application No. 10-2022-0131907 filed on Oct. 14, 2022, in the Korean Intellectual Property Office, the disclosure of which is incorporated herein by reference.

STATEMENT REGARDING PRIOR DISCLOSURE BY THE INVENTOR OR A JOINT INVENTOR

Applicant hereby states that a journal article entitled "CCFont: Component-Based Chinese Font Generation Model Using Generative Adversarial Networks GANs" published on Aug. 10, 2022, a copy of which is submitted herewith in an Information Disclosure Statement, is a prior disclosure made directly or indirectly by the inventor(s), and the prior disclosure made by the inventor(s) do not qualify as prior art under the grace period exception of 35 USC § 102(b)(1).

BACKGROUND

Field

The present disclosure relates to a font generating system and a fond generating method, and more particularly, to a font generating system and a font generating method which decompose, convert, and recompose a complex character including a plurality of components to generate a fonted character.

Description of the Related Art

A font is also called a typeface or a typography and refers to a shape or a style of a letter (or character). Even though the letters correspond to the same language, the fonts may vary, and for the PCs and mobile phones, a plurality of different fonts is provided. Depending on the type of fonts, a viewer may feel different atmospheres even from the same letter so that the font has recently become an important design element.

In the meantime, recently, in accordance with the development of the technology, a font characteristic of handwriting is extracted to be converted into data or a digital format so that the handwriting fonts may be used on the electronic device. However, in order to convert a font corresponding to the handwriting into data, information of the handwriting fonts corresponding to all the letters which configure the language needs to be collected and the collected information needs to be converted into a digital format so that a lot of efforts are necessary.

Specifically, in the case of letters which are formed by combinations of single letters, such as Chinese, Korean (Hangul), and Thai, the number of combinations of single letters is very large so that it is actually classified as a very difficult task to collect data for all letters and convert the letters into data.

Specifically, thousands of combinations obtained by combining a large number of single letters may form letters. For example, in the case of a Chinese character, it has been known that there are 70244 letters (GB18030) of traditional Chinese symbols configured by complex single letters, and there are 6763 letters (GB2312) of simplified Chinese symbols configured by simplified single letters.

As described above, letters having characters configured by combinations of a plurality of single letters may be configured from at least thousands of combinations to tens of thousands of combinations and it is actually impossible to manually convert the letters into the fonts.

In order to solve the problems as described above, studies are actively conducted to generate various combinations of letters using small handwriting data, and as an example thereof, in Korean Patent No. 10-1229175, a method and an apparatus for creating a handwriting font has been disclosed.

SUMMARY

An object of the present disclosure provides a font generating system and a font generating method which provide fonted characters for all Chinese characters.

An object of the present disclosure may provide a font generating system and a font generating method which separate letters to components and convert the component into a fonted component and then recompose to perform font conversion for all letters.

The present disclosure may provide a font generating system and a font generating method with improved reliability and accuracy for a result of generating the font.

The present disclosure may provide a font generating system and a font generating method which perform font conversion of various characters (or languages) including but not limited to Chinese (Chinese character), Thai, or Korean (hangul).

According to various exemplary embodiments of the present disclosure, a font generating system may include a component decomposer which has at least one character input thereto and decomposes the input character into at least one component; a component converter which converts the at least one component into a component with a predetermined font to generate at least one imaging component; and a component recomposer which recomposes the at least one imaging component to generate a fonted character.

The at least one character may be a traditional Chinese symbol or a simplified Chinese symbol.

The component decomposer may separate the at least one character configured by the traditional Chinese character or the simplified Chinese character into radicals to generate at least one first component.

The component decomposer may separate the at least one first component into at least one second component.

The component converter may convert the at least one second component into the component with a predetermined font to generate the imaging component.

The font generating system may be configured to generate the fonted character by separating the component and recombining the imaging component, using a GAN model including at least one encoder and a decoder.

According to various exemplary embodiments, a font generating method may include inputting at least one character input and decomposing the input character into at least one component; generating at least one imaging component by converting the at least one component into a component with a predetermined font; and generating a fonted character by recomposing the at least one imaging component.

The at least one character may be a traditional Chinese character or a simplified Chinese character.

The decomposing to a component may include: separating the at least one character configured by the traditional Chinese character or the simplified Chinese character into radicals to generate at least one first component.

The decomposing to a component may include: separating the at least one first component into at least one second component.

In the generating of an imaging component, the at least one second component may be converted into the component with a predetermined font to generate the imaging component.

The font generating method may be configured to generate the fonted character by separating the component and recombining the imaging component, using a GAN model including at least one encoder and a decoder.

According to the present disclosure, the font generating system and the font generating method may provide fonted characters for all Chinese characters.

A font generating system and a font generating method of the present disclosure separate letters into components and convert the component into a fonted component and then recompose to perform font conversion for all letters.

A font generating system and a font generating method of the present disclosure may have improved reliability and accuracy for a result of generating the font.

A font generating system and a font generating method of the present disclosure may perform font conversion of Chinese (Chinese character), Thai, or Korean (hangul), and perform font conversion for various characters (or languages) without limiting a type of characters for font conversion.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Hereinafter, embodiments of the present disclosure will be described in detail with reference to the accompanying drawings. The following exemplary embodiment is proposed to sufficiently transmit the spirit of the present disclosure to those skilled in the art. The present disclosure is not limited only to the exemplary embodiment proposed herein and may be embodied in other forms. In the drawings, in order to clarify the present disclosure, irrelevant parts to the description are omitted and size of a component may be slightly exaggerated for better understanding.

The exemplary embodiments described in the specification and the configurations illustrated in the drawings are just an exemplary embodiment of the present disclosure and there may be various modifications which replace the embodiments and the drawings of the present specification at the time of filing the present application.

The same reference numbers or symbols presented in each drawing of the present specification may denote a part or a component which performs substantially the same function. In the drawings, shapes and sizes of the elements may be exaggerated for clear description.

The terms used in the specification are used to describe the exemplary embodiment, but are not intended to limit and/or restrict the disclosed disclosure. A singular form may include a plural form if there is no clearly opposite meaning in the context. In the present specification, terminology "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

Terms including an ordinal number, such as "first" or "second" used in this specification may be used to describe various components but the components are not limited by the above terms and are used only to distinguish one component from the other component. For example, without departing from the scope of the present disclosure, a first component may be referred to as a second component, and similarly, a second component may be referred to as a first component. A term of and/or includes combination of a plurality of related elements or any one of the plurality of related elements.

The terms "upper", "lower", "above", or "below" used hereinafter are defined with respect to the drawings so that a shape and a position of each component are not limited by the terms.

Like reference numerals indicate like elements throughout the specification. The specification does not describe all the elements of the exemplary embodiments, but general contents in the technical field to which the present disclosure belongs or the redundant description of the exemplary embodiments may be omitted.

Terms "unit, module, and device" used in the specification may be implemented by software or hardware and according to the exemplary embodiments, a plurality of "units, modules, devices" may be implemented by one component or one "unit, module, device" may include a plurality of components.

Throughout this specification, when it is described that a part is "coupled" to another part, the part may be directly coupled to the other part and also indirectly connected to the other part and the indirect connection includes connection with a wireless communication network therebetween.

In addition, unless explicitly described to the contrary, the word "comprise" and variations such as "comprises" or "comprising", will be understood to imply the inclusion of stated elements but not the exclusion of any other elements.

The terms such as first or second may be used to distinguish one constituent element from the other constituent element, but the component is not limited by the above-described terms.

A singular form may include a plural form if there is no clearly opposite meaning in the context.

In each step, the reference symbol is used for the convenience of description so that the reference symbol does not describe the order of each step and the steps may be carried out in a different order from the specified order unless specific order is clearly described in the context.

Figure 1:
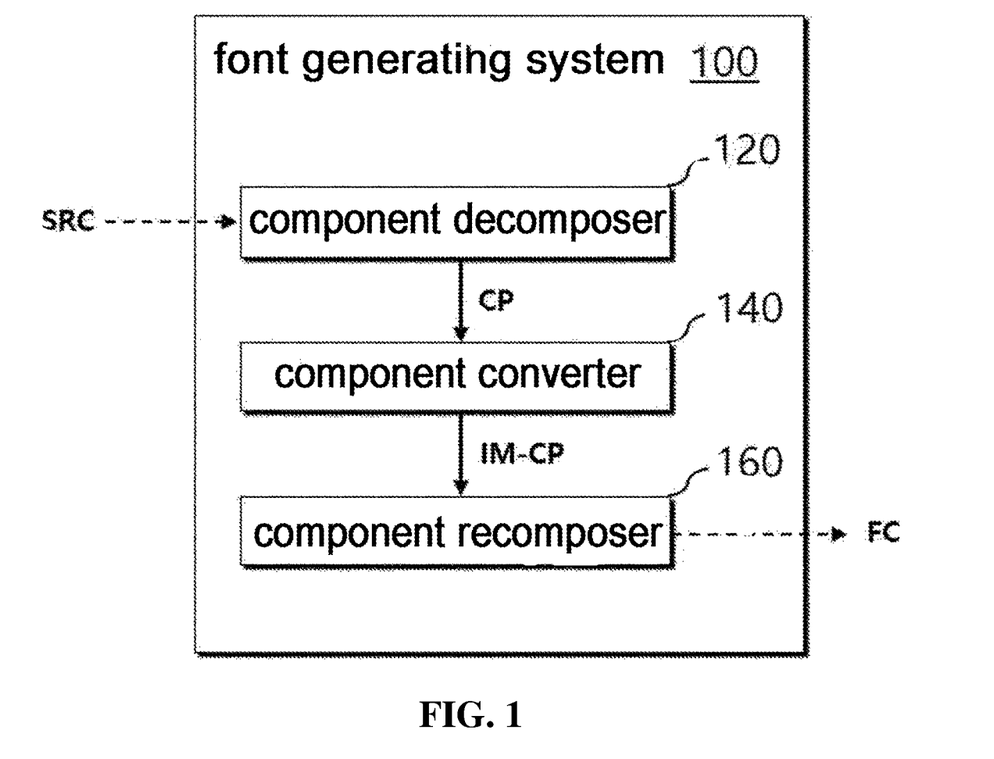
FIG. 1 is a block diagram of a font generating system according to an embodiment of the present disclosure.

FIG. 1 is a block diagram of a font generating system according to an exemplary embodiment of the present disclosure.

Referring to FIG. 1, a font generating system 100 may include a component decomposer 120, a component converter 140, or a component recomposer 160.

For example, a source character SRC for generating a font may be Chinese (Chinese character), Thai, or Korean (Hangul), but is not limited thereto. Hereinafter, for the convenience of description, a method for generating a font of Chinese will be described as an example, but the present disclosure is not limited thereto, and may be configured to convert fonts of various source characters SRCs.

The component decomposer 120 may separate or decompose source character SRC input to the font generating system 100 into components CPs.

For example, the source character SRC may be a traditional Chinese character or a simplified Chinese character. The present disclosure may generate a font of a Chinese character as a source character SRC regardless of a traditional Chinese character or a simplified Chinese character.

The component decomposer 120 may separate all Chinese characters of combinations of the Chinese characters which are combinations of the input source character SRC into components CPs. The component CP may be a radical which configures the Chinese character, but is not limited thereto.

The component decomposer 120 separates components CPs for each Chinese character of the source character SRC, and the separated components CPs may be converted into components with a predetermined font in the component converter 140, and the converted components may be defined as imaging components IM-CPs. The components with a predetermined font may be components designed by a user, but are not limited thereto.

Accordingly, a certain Chinese character is converted into components of the certain Chinese character to form imaging components IM-CPs. When the imaging components IM-CPs are composed again in the component recomposer 160, a fonted character FC for the certain Chinese character may be formed.

The font generating system 100 according to the exemplary embodiment of the present disclosure performs the above-described process on all Chinese characters for the input source charters SRCs to form fonted characters FCs of all Chinese characters for the source characters SRCs.

Figure 2:
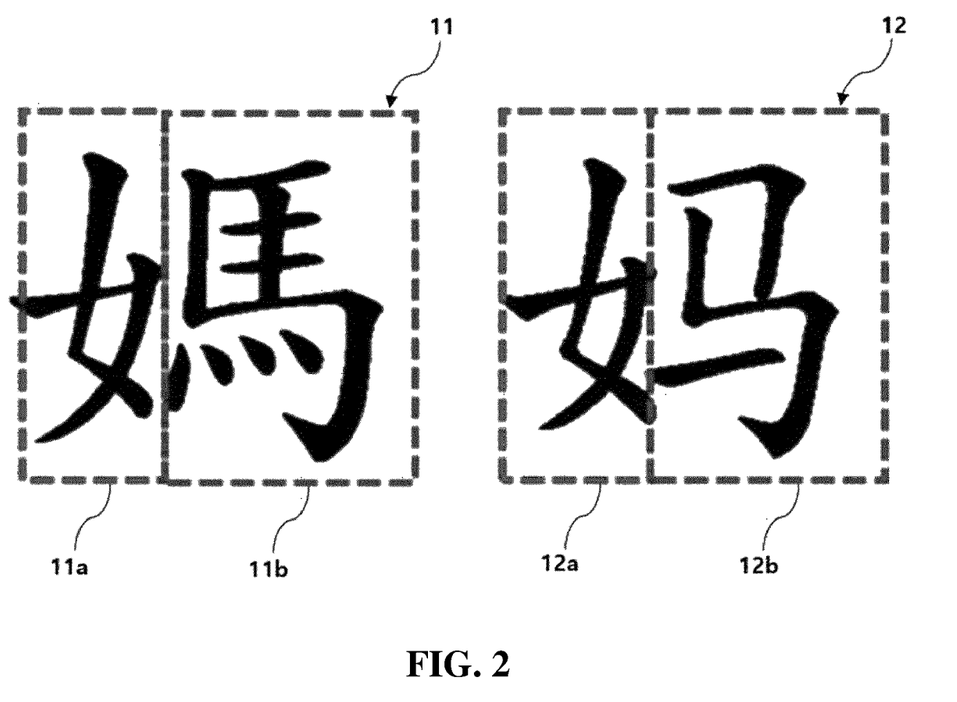
FIG. 2 is a view for explaining a radical of a Chinese character, according to an exemplary embodiment of the present disclosure.

FIG. 2 is a view for explaining a radical of a Chinese character, according to an exemplary embodiment of the present disclosure.

The Chinese characters illustrated in FIG. 2 are a traditional Chinese symbol 11 and a simplified Chinese symbol 12 representing mother Ma (meaning: mother, pronunciation: ma).

In addition to the illustrated Chinese characters 11 and 12, the remaining Chinese Characters may be configured by a left radical and a right radical, and an upper direction and a lower direction, or configured by one radical.

As seen from the illustrated Chinese characters 11 and 12, the left radicals 11*a* and 12*a* indicate meanings, and the right radicals 11*b* and 12*b* indicate pronunciation (sounds). As seen from the right radicals of the illustrated Chinese characters 11 and 12, even though they are the same Chinese characters (meaning: horse, Pronunciation: ma) 11*b* and 12*b*, the shapes are substantially different from each other. Even though the letters are the same Chinese characters, the shapes of the letter may vary depending on the traditional Chinese symbol or the simplified Chinese symbol. Accordingly, the font generating systems of the related art cannot propose an appropriate method for converting numerous Chinese characters.

The font generating system 100 according to the exemplary embodiment of the present disclosure may separate or decompose the Chinese characters having a complex structure as described above into components CPs to generate fonts for all Chinese characters regardless of the traditional Chinese character or the simplified Chinese character.

Figure 3:
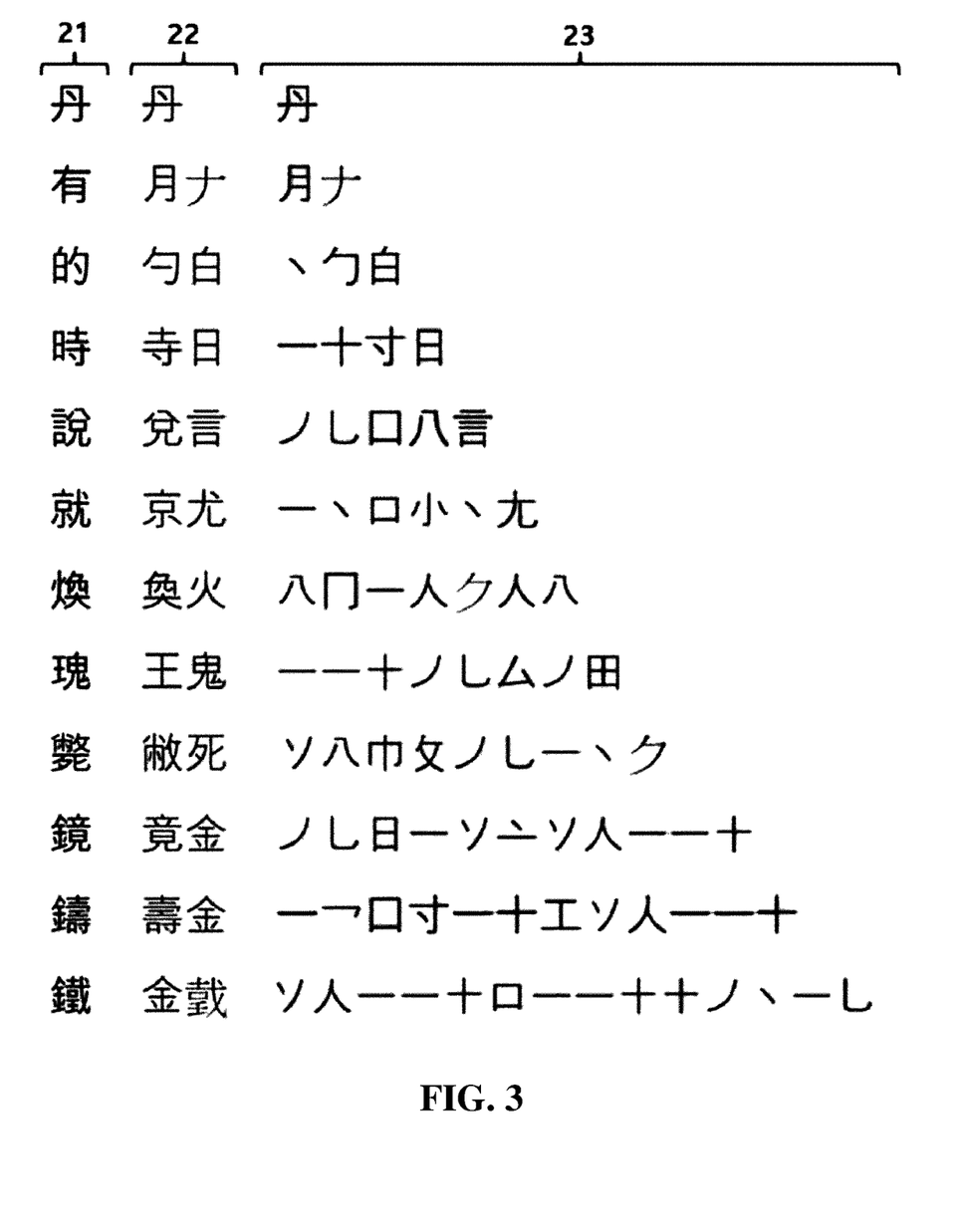
FIG. 3 is a view for explaining a process of separating the Chinese character into components by a component decomposer of a font generating system according to an exemplary embodiment of the present disclosure.

FIG. 3 is a view for explaining a process of separating the Chinese character into components by a component decomposer of a font generating system according to an exemplary embodiment of the present disclosure.

Referring to FIG. 3, the source character SRC 21 is illustrated. The component decomposer 120 may separate the source character SRC 21 into a first component 22 configured by a left radical and a right radical. Referring to the illustrated exemplary embodiment, the first component 22 may be configured by one radical or two radicals (left radical and right radical).

The component decomposer 120 may separate the first component 22 into second components 23 which are the minimum units. The second component 23 may form a component CP which is to be converted into a component with a predetermined font by the component converter 140.

As described above, the component decomposer 120 may convert the Chinese characters of the source character SRC into second components 23 of the minimum unit for the font processing. The second components CPs 23 are converted into a component with a predetermined font by the component converter 140 to form imaging components IM-CPs.

Figure 4:
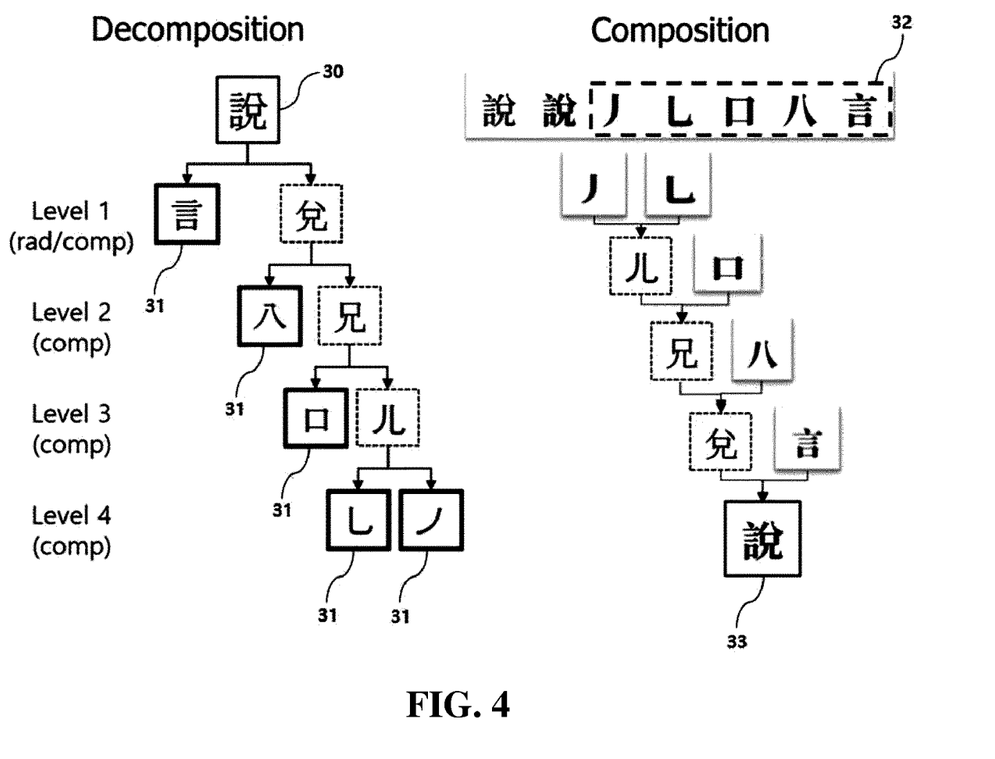
FIGS. 4 and 5 are views for explaining a process of generating a fonted Chinese character for a certain Chinese character by a font generating system according to an exemplary embodiment of the present disclosure.
Figure 5:
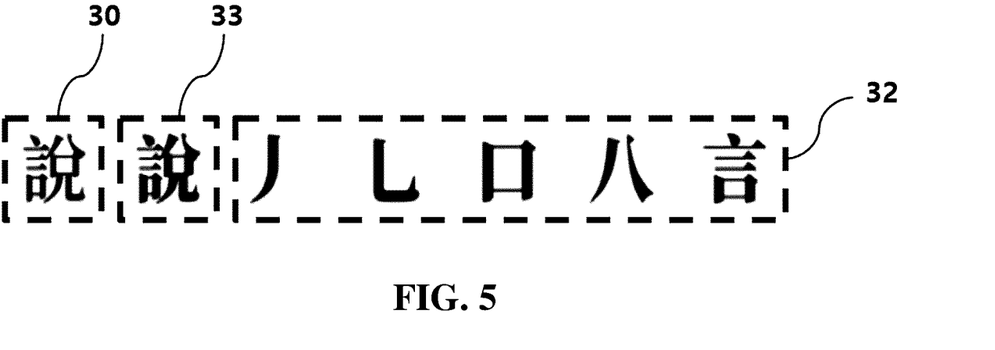

FIGS. 4 and 5 are view for explaining a process of generating a fonted Chinese character for a certain Chinese character by a font generating system according to an exemplary embodiment of the present disclosure.

Referring to FIGS. 4 and 5, the certain Chinese character 30 may be separated or decomposed into five components 31 by the component decomposer 120. The five separated or decomposed components CPs 31 are converted into a component with a predetermined font by the component converter 140 to form imaging components IM-CPs 32. The imaging components IM-CPs 32 are recomposed by a component recomposer 160 to form a fonted character or a fonted Chinese character 33.

even though most of Chinese characters (approximately, 99.99%) have less than 14 components, some Chinese characters may have 14 or more components. Further, the traditional Chinese character may have components more than that of the simplified Chinese character.

Figure 6:
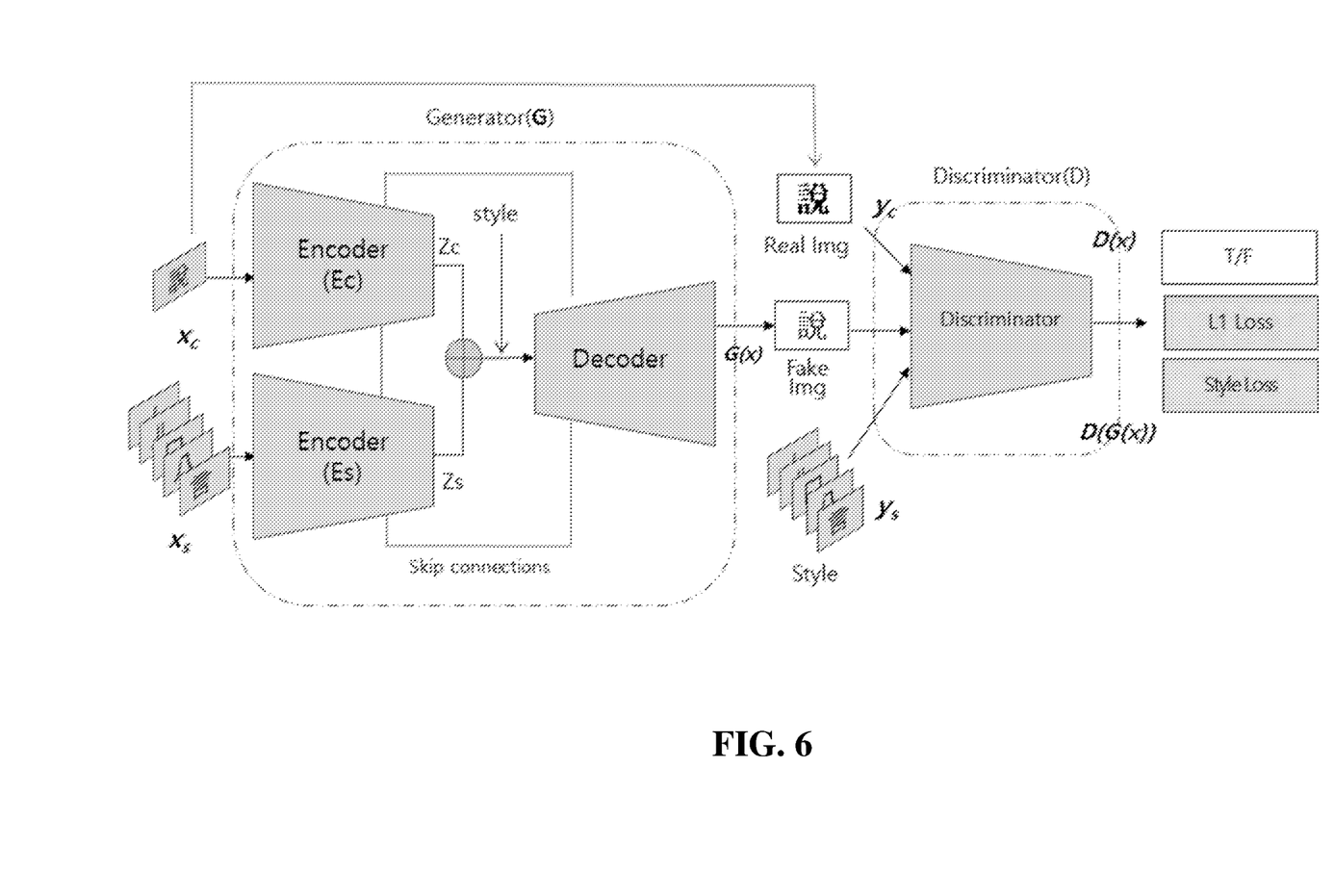
FIGS. 6 and 7 are views for explaining a configuration of a model included in a font generating system, according to an exemplary embodiment of the present disclosure.
Figure 7:
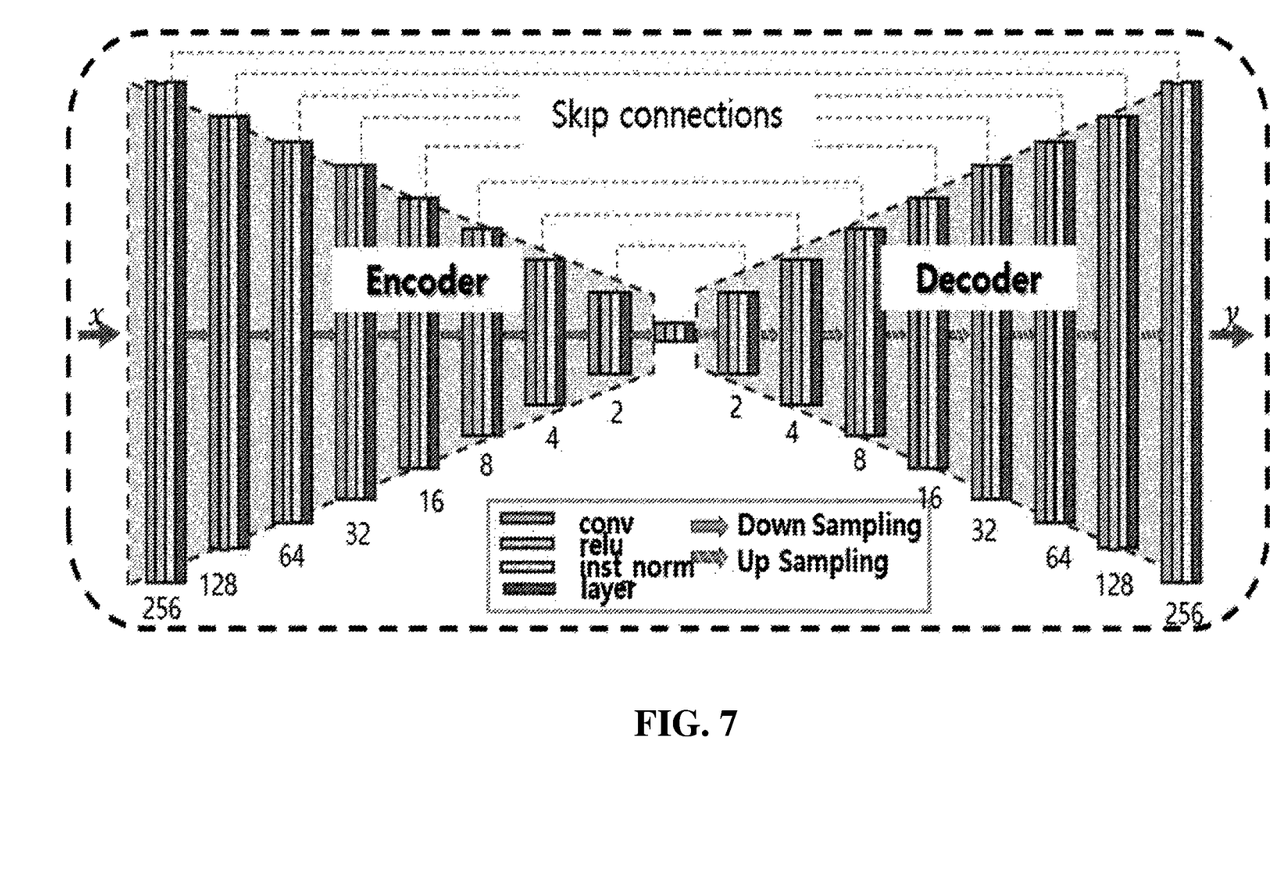

FIGS. 6 and 7 are views for explaining a configuration of a model included in a font generating system, according to an exemplary embodiment of the present disclosure.

Figure 8:
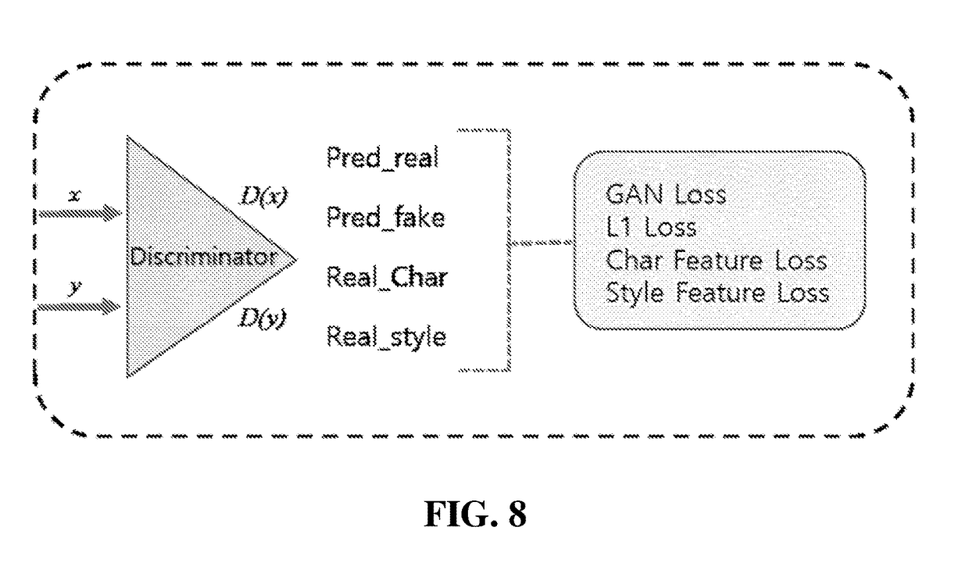
FIG. 8 is a block diagram illustrating a discriminator according to an exemplary embodiment of the present disclosure.

FIG. 8 is a block diagram illustrating a discriminator according to an exemplary embodiment of the present disclosure.

Referring to FIGS. 6 to 8, the font generating system 100 may generate a fonted character using a model including an encoder and a decoder.

In order to generate a high quality fonted Chinese character image from a Chinese character with a complex shape, it is necessary to accurately extract an information feature of a target style so as not to lose information during the training of the model.

The font generating system 100 of the present disclosure may include a generative adversarial networks using a generation (GAN) model. The GAN model according to the exemplary embodiment of the present disclosure may include two encoders, unlike the general GAN model. A first encoder Ec generates font content information, and a second encoder Es may generate font style information. This is to obtain more accurate style information from the target font component so that an image for every component may be maintained to prevent the loss.

Referring to FIG. 6, the GAN model of the present disclosure may be a model which utilizes a configuration of the Chinese character and a component in a one-to-many framework. Further, the GAN model may have two encoder structures Ec and Es as a conditional GAN structure which uses a content image Xc and a style image Xs of a letter component to be converted as inputs. The first encoder Ec and the second encoder Es may down-sample to a plurality of layers. Each convolution layer uses a kernel of 4 and a stride of 2, and may follow instance normalization (IN), except for a first layer using a kernel of 7 and a stride of 1. The GAN model of the present disclosure uses LeakyReLU as an activation function, and a skip connection (SC) structure may be formed in all the layers.

Result potential vectors Zc and Zs of the first encoder Ec and the second encoder Es are combined to be used as an input for the decoder and then are up-sampled by a plurality of convolution layers to generate contents with a converted style. As one example, each layer may perform the deconvolution using a kernel of 5, a stride of 1, instant normalization, and a LeakyReLU function. All the layers may form a skip connection SC structure in which an encoder layer and contents/style are combined with the up-sampled vector. Further, the result image G(x) may be generated by the convolution and a tan h function. The generated result is input to the discriminator D, and the source image and the generated result image are compared to calculate a GAN loss. Letter and style losses are calculated by comparing a vector generated from an original image and the result image vector, and an image quality may be improved by comparing the target image and the generated image L1 loss.

The font generating system 100 of the present disclosure and/or the GAN model included therein compare the original image and the generated result image to calculate a loss, and may discriminate whether a font of the character of the generated result image using the loss is equal to a font of a character of the original image.

For example, the font generating system 100 of the present disclosure and/or the GAN model included therein adds an adversarial loss $L_{ADV}$, a style loss $L_S$, and an L1 loss $L_{L1}$ to calculate the loss.

The adversarial loss $L_{ADV}$ may be represented by the following Equation 1 known as min-max loss.

$$\min G \max DL_{ADV}(G,D)=Ey[\log D(y)]+Ex[\log(1-D(G(x)))] \quad \text{[Equation 1]}$$

For example, the font discriminator of the GAN model discriminates whether the input image G(x) is true (true: 1) or false (false: 0) to maximize (D(y)=1).

The style loss $L_S$ may be represented by the following Equation 2 which maximizes $D(y_S)$ and minimizes $G(x_S)$.

$$\min G \max DLs(G,D)=Ey[\log D(y_S)]+Ex[\log(1-D(G(x_S)))] \quad \text{[Equation 2]}$$

For example, the font discriminator discriminates true or false to generate a one-to-many style converted image, and may discriminate $D(y_S)$ whether the generated character style is equal to the original character style.

The L1 loss $L_{L1}$ may be represented by the following Equation 3.

$$L_{L1}=Ex,y[\|Y-G(x)\|] \quad \text{[Equation 3]}$$

For example, the font discriminator reduces a mean absolute error (MAE) value obtained by comparing an original character style and the generated character style for every pixel to make two images equal to each other.

Figure 9:
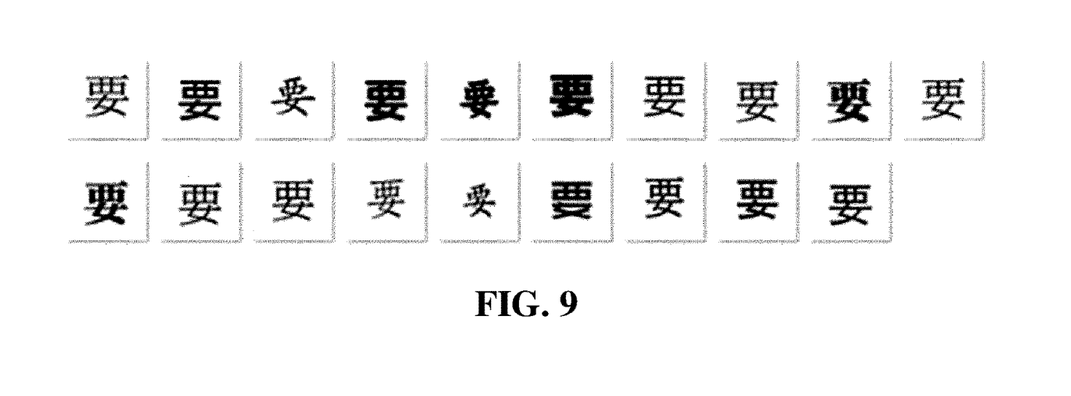
FIG. 9 is a view for explaining a state in which letters having various fonts are generated using a font generating system, according to an exemplary embodiment of the present disclosure.

FIG. 9 is a view for explaining a state in which letters having various fonts are generated using a font generating system, according to an exemplary embodiment of the present disclosure. Referring to FIG. 9, Chinese characters with various fonts generated for a certain Chinese character using the font generating system 100 of the present disclosure are illustrated.

Figure 10:
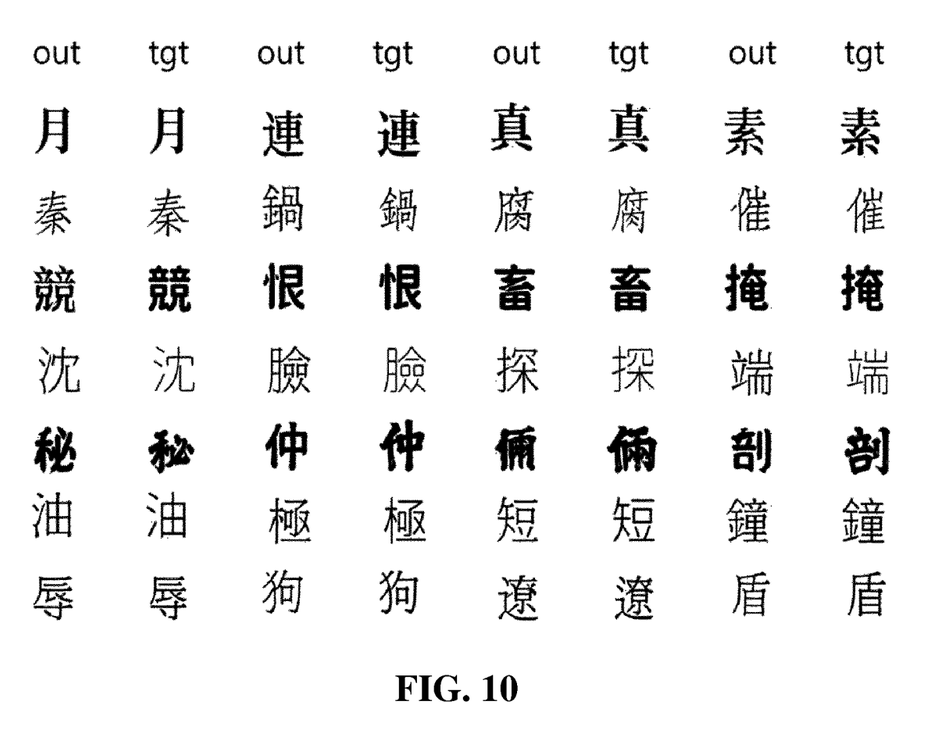
FIG. 10 is a view illustrating a part of a character generated using a font generating system according to an exemplary embodiment of the present disclosure.

FIG. 10 is a view illustrating a part of a character generated using a font generating system according to an exemplary embodiment of the present disclosure.

Referring to FIG. 10, it is confirmed that the font generating system of the present disclosure outputs a character with a style which is the same as the targeted font tgt.

Figure 11:
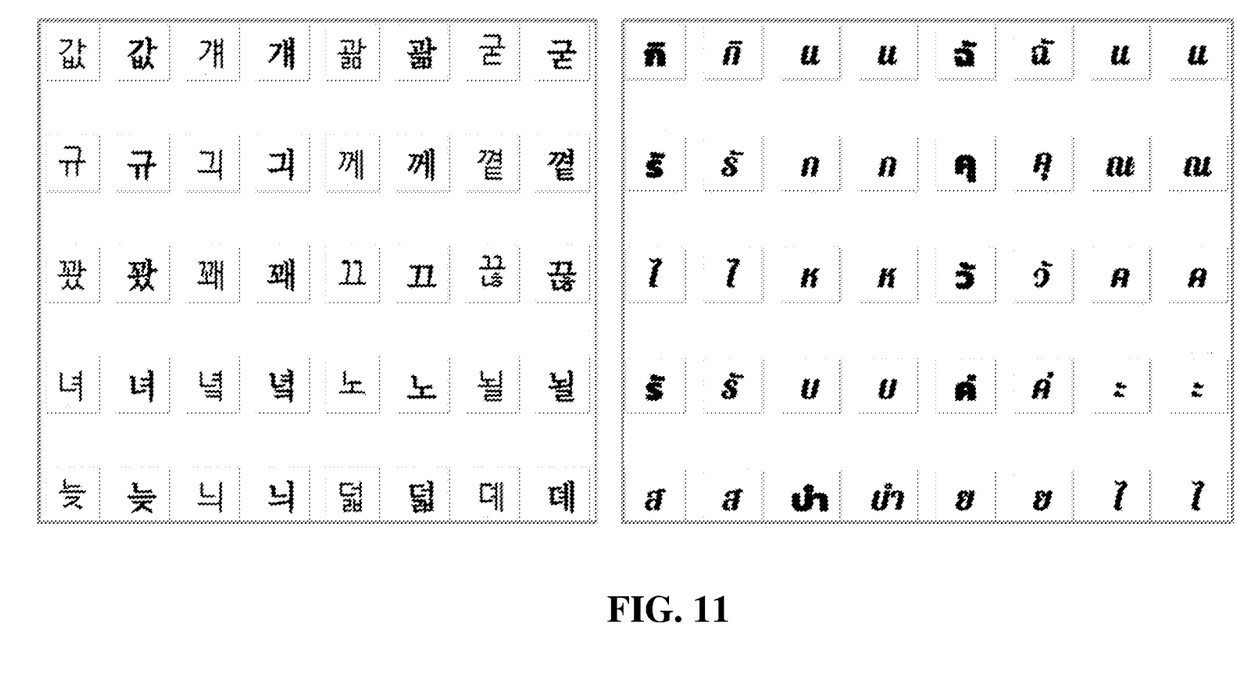
FIG. 11 is a view illustrating a fonted result of Korean and Thai using a font generating system according to an exemplary embodiment of the present disclosure.

FIG. 11 is a view illustrating a fonted result of Korean and Thai using a font generating system according to an exemplary embodiment of the present disclosure.

Referring to FIG. 11, the font generating system of the present disclosure may be applied to various characters which are separated into components, such as Korean or Thai, as well as the Chinese character.

Figure 12:
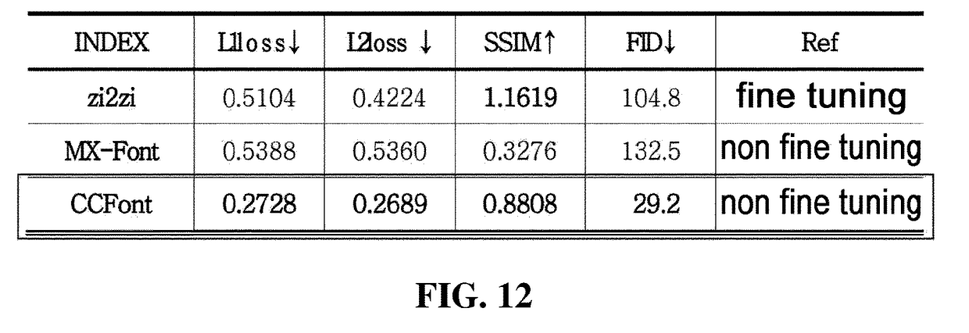
FIG. 12 is a table illustrating a result of quantitatively comparing font generating results of a font generating system of the present disclosure and a font generating system of the related art.
Figure 13:
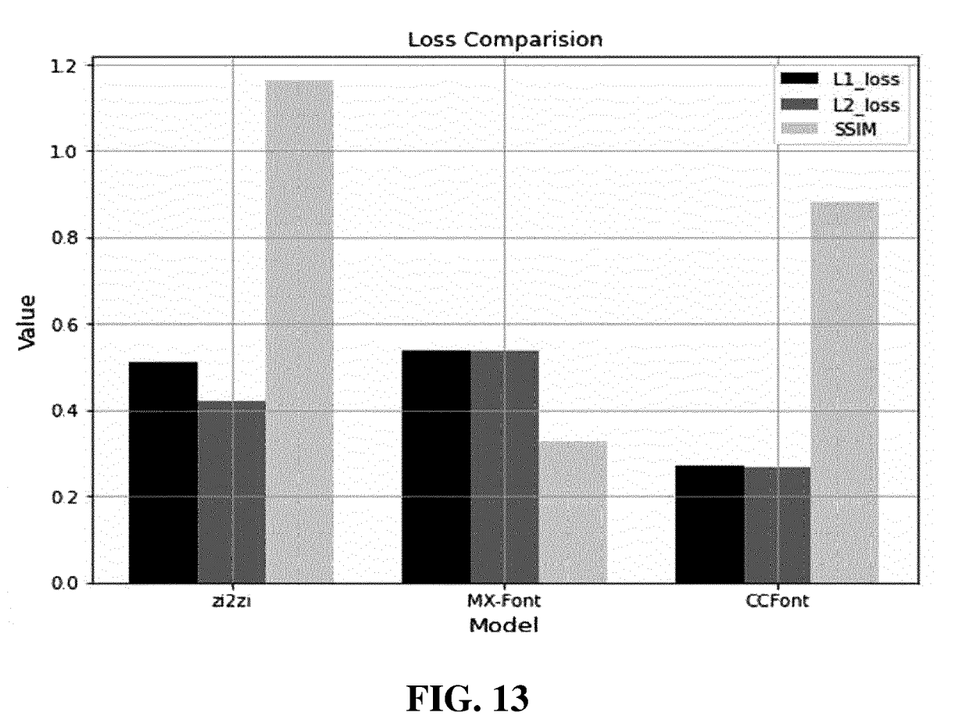
FIG. 13 is a table illustrating quantitatively comparing font generating results of a font generating system of the present disclosure and a font generating system of the related art.
Figure 14:
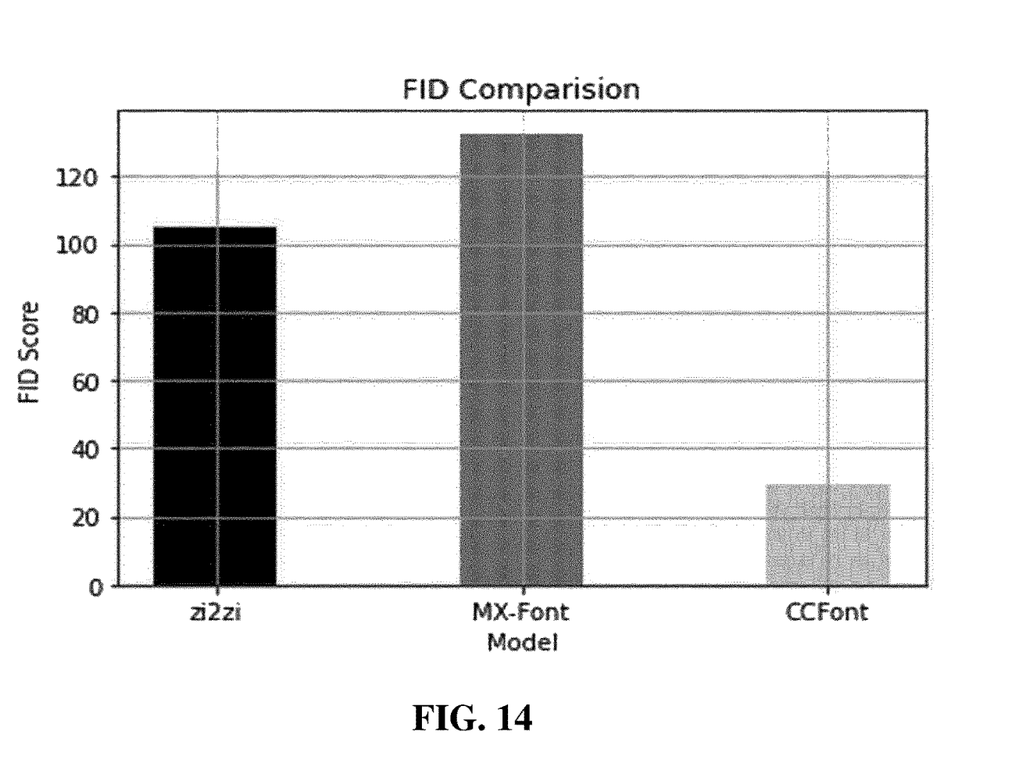
FIG. 14 is a table illustrating quantitatively comparing font generating results of a font generating system of the present disclosure and a font generating system of the related art.

FIG. 12 is a table illustrating a result for quantitatively comparing font generating results of a font generating system of the present disclosure and a font generating system of the related art. FIG. 13 is a table illustrating quantitatively comparing font generating results of a font generating system of the present disclosure and a font generating system of the related art. FIG. 14 is a table illustrating quantitatively comparing font generating results of a font generating system of the present disclosure and a font generating system of the related art.

In order to identify the performance of the font generating system CCFont 100 of an exemplary embodiment of the present disclosure, among the font generating systems of the related art, zi2zi and MX-font are compared. It is understood that the font generating system CCFont of an exemplary embodiment of the present disclosure may generate a high quality font which is clear and sharp, as compared with zi2zi and MX-Font.

Referring to FIGS. 12 and 13, L1 and L2 losses of the CCFont model are (0.2728, 0.2689) which are generated without fine tuning and are significantly lower than those values of the zi2zi model (0.5104, 0.4225) and the MX-Font model (0.5388, 0.5306). The similarity of the CCFont model is 0.8808, which is higher than that of the MX-Font model (0.3276) so that it shows that the CCFont model is superior.

Further, the CCFont model derives the similarity value without the fine tuning, as compared with the zi2zi in which the fine tuning is performed. As a consequence, the CCFont model provides a fonted letter with an improved quality without performing the fine tuning so that the time and effort for the font processing are saved.

An FID score is a figure of merit which calculates a distance between a feature vector of a real image and a feature vector of a fake image. That is, the lower FID score may mean that the quality of the image of the character generated by the font generating system is more similar to the real one and more excellent.

Further, the lower FID score is evaluated closer to the original and the CCFont model has an FID score of 29.2 which is lower than those values of the zi2zi (104.8) and the MX-Font (132.5) so that the excellence of the present disclosure which performs the font processing without losing the structure of the character may be confirmed.

Figure 15:
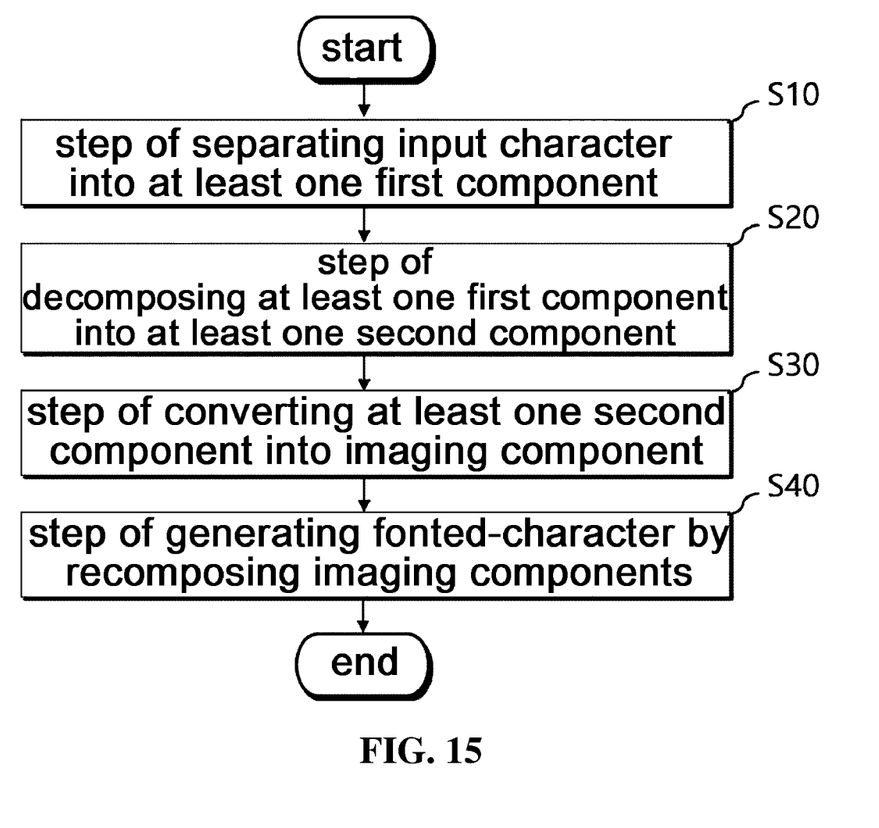
FIG. 15 is a flowchart for explaining a font generating method according to an exemplary embodiment of the present disclosure.

FIG. 15 is a flowchart for explaining a font generating method according to an exemplary embodiment of the present disclosure.

A font generating method of the present disclosure uses the font generating system 100, and may include a step S10 of decomposing an input character into at least one first component, a step S20 of decomposing at least one second→first component into at least one second component, a step S30 of converting at least one second component into an imaging component, and a step s40 of recomposing the imaging components to generate a fonted character.

Additionally, referring to FIGS. 12 to 14, the lower the FID score, the closer to the original, so that as compared with the scores of zi2zi (104.8) and the MX-Font (132.5), the FID score of the CCFont is 29.2 which is low so that the excellence of the present disclosure is confirmed.

The system and the method described above may be implemented by a hardware component, a software component, and/or a combination of the hardware component and the software component. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable array (FPA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of processing element. For example, the processing device may include a plurality of processors or include one processor and one controller. Further, another processing configuration such as a parallel processor may be allowed.

The method according to the example embodiment may be implemented as a program command which may be executed by various computers to be recorded in a computer readable medium. The computer readable medium may include solely a program command, a data file, and a data structure or a combination thereof. The program instruction recorded in the medium may be specifically designed or constructed for the example embodiment or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the example embodiment and vice versa.

Although the exemplary embodiments have been described above by the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. Therefore, other implements, other embodiments, and equivalents to the claims are within the scope of the following claims.

As described above, even though the present disclosure has been described by the limited exemplary embodiment and drawings, the present disclosure is not limited thereto. Accordingly, various modifications and variations can be made by those skilled in the art within the spirit of the present disclosure and the equivalent scope of the claims to be described below.

What is claimed is:

1. A font generating system, comprising:
   a component decomposer which has at least one character input thereto and decomposes the input character into at least one component;
   a component converter which converts the at least one component into a component with a predetermined font to generate at least one imaging component; and
   a component recomposer which recomposes the at least one imaging component to generate a fonted character,
   wherein the font generating system is configured to generate the fonted character by decomposing the component and recombining the imaging component, using a GAN model including at least one encoder and a decoder.

2. The font generating system according to claim 1, wherein the at least one character is a traditional Chinese character or a simplified Chinese character.

3. The font generating system according to claim 2, wherein the component decomposer decomposes the at least one character configured by the traditional Chinese character or the simplified Chinese character into radicals to generate at least one first component.

4. The font generating system according to claim 3, wherein the component decomposer decomposes the at least one first component into at least one second component.

5. The font generating system according to claim 4, wherein the component converter converts the at least one second component into the component with a predetermined font to generate the imaging component.

6. A font generating method, comprising:
inputting at least one character input and decomposing the input character into at least one component;
generating at least one imaging component by converting the at least one component into a component with a predetermined font; and
generating a fonted character by recomposing the at least one imaging component,
wherein the font generating method is configured to generate the fonted character by decomposing the component and recombining the imaging component, using a GAN model including at least one encoder and a decoder.

7. The font generating method according to claim 6, wherein the at least one character is a traditional Chinese character or a simplified Chinese character.

8. The font generating method according to claim 7, wherein the decomposing to a component includes:
decomposing the at least one character configured by the traditional Chinese character or the simplified Chinese character into radicals to generate at least one first component.

9. The font generating method according to claim 8, wherein the decomposing to a component includes:
decomposing the at least one first component into at least one second component.

10. The font generating method according to claim 9, wherein in the generating of an imaging component, the at least one second component is converted into the component with a predetermined font to generate the imaging component.

* * * * *